United States Patent [19]

Becker et al.

[11] 4,419,621
[45] Dec. 6, 1983

[54] MONITORING SYSTEM FOR THE CAPACITOR BATTERIES OF A THREE-PHASE FILTER CIRCUIT

[75] Inventors: Michael Becker, Uttenreuth; Alfons Fendt, Erlangen; Dusan Povh, Nuremberg; Klaus Renz, Fürth; Gerhard Schuch, Erlangen; Hermann Waldmann, Weiher, all of Fed. Rep. of Germany

[73] Assignee: Siemens Aktiengesellschaft, Munich, Fed. Rep. of Germany

[21] Appl. No.: 265,459

[22] Filed: May 20, 1981

[30] Foreign Application Priority Data

May 27, 1980 [DE] Fed. Rep. of Germany ....... 3020110

[51] Int. Cl.³ .............................................. G01R 31/02
[52] U.S. Cl. .................................. 324/51; 324/60 C; 324/57 R
[58] Field of Search .................... 324/51, 60 C, 60 R, 324/426, 427, 430, 434, 444, 57 Q, 57 R

[56] References Cited

U.S. PATENT DOCUMENTS 3,466,538 9/1969 Becker et al. ..................... 324/57 R
3,832,631 8/1974 Koga et al. .................. 324/57 Q X
4,243,933 1/1981 Rollman ...................... 324/60 C X

FOREIGN PATENT DOCUMENTS 52-75472 6/1977 Japan .................................. 324/427
55-147367 11/1980 Japan .................................. 324/427

Primary Examiner—Stanley T. Krawczewicz
Attorney, Agent, or Firm—Kenyon & Kenyon

[57] ABSTRACT

A system for monitoring the capacitor batteries of a three-phase filter circuit. Each capacitor battery is formed of a plurality of parallel legs each having a plurality of sectional capacitors which are connected in series with fuses. Adjacent ones of the sectional capacitors are coupled to one another. In a three-phase system, three capacitor batteries are coupled to one another in a Y-circuit configuration, the Y-circuit node being coupled to a reference potential, illustratively ground. The magnitude and phase of the fundamental frequency component of the current flowing from the Y-circuit node to the reference potential is monitored, variations therein being evaluated to identify defective sectional capacitors. Only variations in the Y-circuit node current which occur rapidly will trigger fault signals, thereby preventing false indications resulting from variations in temperature.

8 Claims, 9 Drawing Figures

MONITORING SYSTEM FOR THE CAPACITOR BATTERIES OF A THREE-PHASE FILTER CIRCUIT

BACKGROUND OF THE INVENTION

This invention relates generally to systems for monitoring capacitor batteries, and more particularly to a system for monitoring the capacitor batteries of a three-phase filter circuit having three filter legs connected in a Y-configuration which is connected to a reference potential at the junction of the three filter legs. Each capacitor battery is formed of a plurality of parallel legs each having a plurality of sectional capacitors connected in series with fuses, adjacent ones of the sectional capacitors being connected to one another by cross lines.

The generation of multi-phase rotary voltages, such as are produced by converters, produce a line frequency fundamental component on which are superimposed characteristic harmonics. Filtering is generally achieved by using filters which are tuned to the frequencies of the characteristic harmonics. At the fundamental frequency, such filter circuits appear as capacitive impedances.

The capacitances of filter circuits are generally formed of a capacitor battery having a plurality of parallel legs, each such leg having a plurality of sectional capacitors which are each connected in series with respective fuses. Sectional capacitors in adjacent legs are interconnected by continuous cross lines. Thus, a multiplicity of sectional capacitors may be contained within a capacitor battery. In fault situations where a sectional capacitor short circuits, adjacent ones of the interconnected sectional capacitors discharge via the cross lines to the fuse which is connected in series with the defective sectional capacitor, causing the fuse to open circuit. Such a failure of a sectional capacitor causes the overall filter circuit to become detuned. However, such detuning results in only slight change in the filter current at the fundamental frequency component, thereby rendering detection of a defect in a single sectional capacitor to be difficult to perform with known current monitoring and measuring systems. This problem is further compounded by the fact that variations in the filter current resulting from changes in the ambient temperature may be greater than the current changes which occur as a result of the failure of one or more sectional capacitors.

It is, therefore, an object of this invention to provide a monitoring system for the capacitor battery of a three-phase filter circuit, the capacitor battery being of the type which contains a multiplicity of interconnected sectional capacitors with series-connected fuses.

It is a further object of this invention to provide a capacitor battery monitoring system which reliably indicates the failure of one or more sectional capacitors.

SUMMARY OF THE INVENTION

The foregoing and other objects are achieved by this invention which provides a system for monitoring the capacitor batteries of a three-phase filter circuit having filter legs which are connected in Y-configuration which is connected to a reference potential at the common node of the filter legs. Variations in the magnitude and phase of the fundamental frequency component of the current flowing from the common node of the filter legs to the reference potential are sensed and evaluated to identify defective sectional capacitors in a capacitor battery.

The inventive monitoring system advantageously prevents fault indications in embodiments wherein the capacitor batteries of the three-phase filter circuit are exposed to different temperatures. This is achieved by evaluating the variations in the current with respect to time so as to permit only rapid changes to produce fault indications.

In one practical circuit embodiment of the inventive monitoring system which has been constructed in accordance with the principles of the invention, the following components and subsystems are included:

a. a current measuring transformer is provided for measuring the current flowing from the common node of the Y-connected filter legs of a three-phase filter circuit to a reference potential;

b. voltage measuring transformers are provided for measuring the network phase voltages of the filter circuit;

c. a filter section is provided for obtaining the fundamental frequency component of the compensated Y-circuit node current;

d. circuitry is provided for evaluating the phase of the Y-circuit node current, such phase evaluating circuitry being triggered in response to the fundamental frequency component of such node current, and a network-side phase voltage from one of the voltage measuring transformers. The phase monitoring circuitry produces a fault signal corresponding to the imaginary component of the fundamental frequency component of the Y-circuit node current, with respect to the respective network-side phase voltage, the signal being transient-evaluated by a differentiator;

e. compensation elements are provided which are triggered at the input side by the output signals of all of the phase monitoring circuits, the compensation elements eliminating from consideration the output signals of the phase monitoring circuits which are associated with capacitor batteries which are not affected by a defective sectional capacitor; and f. there is further provided a signalling and release circuit having phase indicators which are coupled to the compensation elements and contain counting stages for determining the number of sectional capacitors in a capacitor battery which have failed.

In a network which is asymmetrically fed or loaded, a compensation circuit is provided for forming a compensated Y-circuit node current. The compensation circuit is provided with electronic filter simulators which are coupled at their input to the voltage measuring transformers and produce simulated phase current values. The compensation circuit further contains a summing amplifier for producing a simulation signal, and a differential amplifier for forming a signal responsive to the differences between a signal corresponding a simulated Y-circuit node current, and the Y-circuit node current measured by the current measuring transformer.

BRIEF DESCRIPTION OF THE DRAWINGS

Comprehension of the invention is facilitated by reading the following detailed description in conjunction with the annexed drawings in which.

DETAILED DESCRIPTION

This invention is based upon the fact that in a three-phase filter circuit arrangement wherein the Y-connected LC series resonant filter circuits are identically constructed, no current should flow from the common node of the Y-circuit to a reference potential, illustratively ground, in an undisturbed state. However, a failure of a capacitor in one of the capacitor batteries of the three-phase filter circuit produces a variation in the Y-circuit node current which can be measurably detected. The particular one of the capacitor batteries which contains the defective sectional capacitor is detected by correlating the changed Y-circuit node current with the three-phase voltages. The changes in the Y-circuit node current are analyzed with respect to time so that slow variations in the current, such as those caused by variations in temperature, do not produce a fault indication, while rapid current changes, such as those produced by a defective sectional capacitor, are evaluated and indicated.

Figure 1:
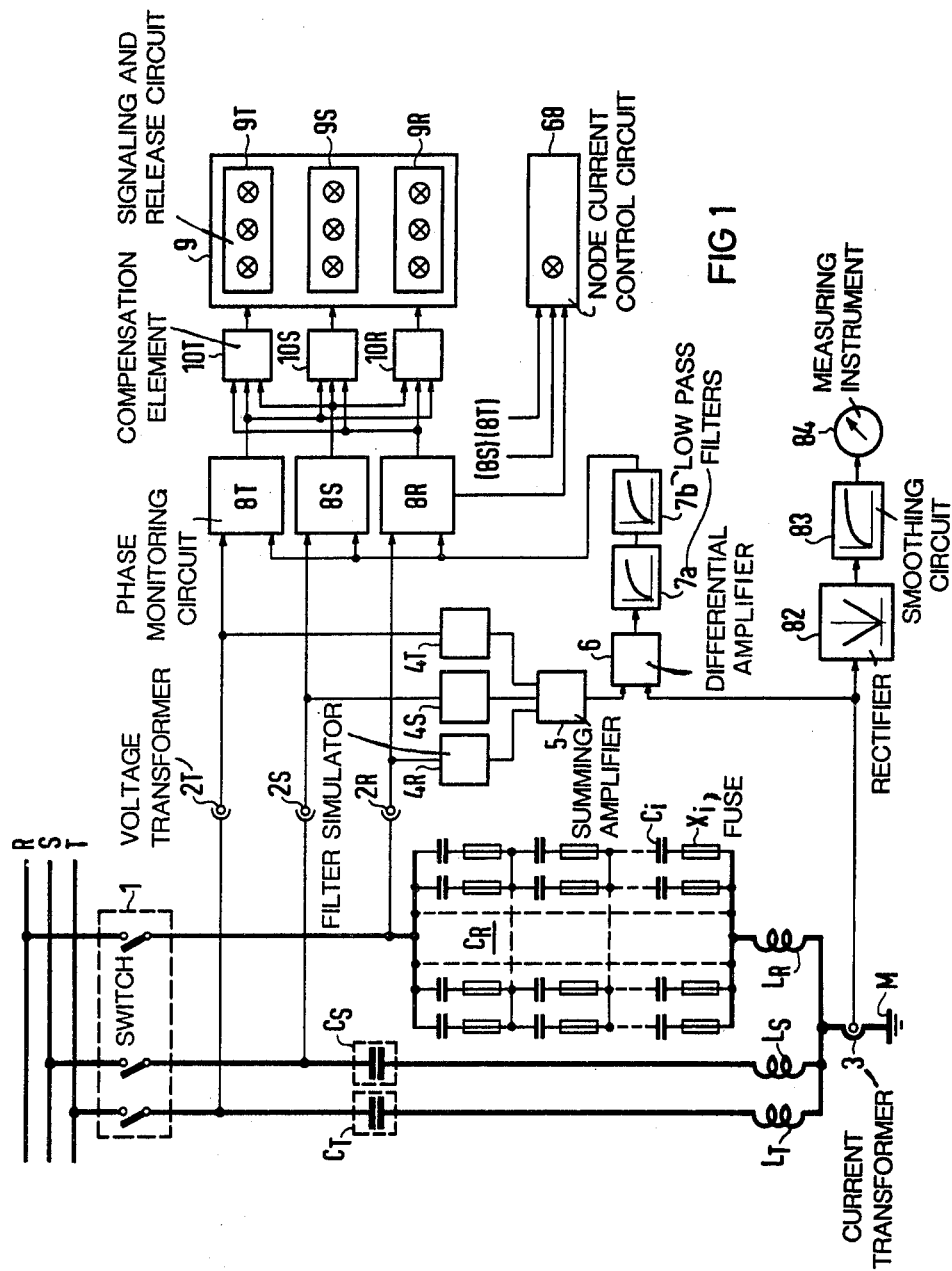
FIG. 1 is a block and schematic representation of a monitoring system constructed in accordance with the principles of the invention.

FIG. 1 shows an embodiment of a monitoring circuit constructed in accordance with the invention, for capacitor batteries $C_R$, $C_S$, $C_T$, of a three-phase filter circuit, wherein the filter legs are connected to a three-phase bus bar having phases RST, by a switching device 1.

The three-phase filter circuit consists of three LC series resonant circuits which are connected in a Y-configuration and connected to ground at the common node. The LC series resonant circuits are tuned to the frequency of a characteristic harmonic.

Capacitor batteries $C_R$, $C_S$, $C_T$, of the three-phase filter circuit, each consists of a multiplicity of parallel legs, each having a plurality of sectional capacitors $C_i$ which are connected in series with respective fuses $X_i$, adjacent ones of the sectional capacitors being connected by continuous cross lines. In order to preserve the clarity of the drawing, only the capacitor battery $C_R$, which corresponds to phase R of the three-phase network, is shown in detail, while the identically constructed capacitor batteries $C_S$ and $C_T$ are represented only the symbol of a capacitor. In some embodiments, each of the capacitor batteries may contain more than 100 single sectional capacitors. Thus, the failure of a single sectional capacitor has very little effect upon the overall capacitance of the associated capacitor battery, and therefore only very slight variations in the phase current through the affected capacitor battery are produced. Such slight current changes are difficult to detect by measurement in view of the high current strengths of the phase currents. Thus, the inventive monitoring system evaluates the current flowing between Y-circuit node to ground, which in the undisturbed state should equal zero.

The phase voltage of the LC series resonant circuit containing the capacitor battery $C_R$ and the choke $L_R$ is detected by a potential-isolating voltage measuring transformer 2R. Similarly, the phase voltage of the LC series resonant circuit containing the capacitor battery $C_S$ and choke $L_S$ is measured by a potential-isolating voltage measuring transformer 2S, and the phase voltage of the LC series resonant circuit containing the capacitor battery $C_S$ and $L_S$ is measured by a potential-isolating voltage measuring transformer 2S and the phase voltage of the LC series resonant circuit containing the capacitor battery $C_T$ and choke $L_T$ is measured by a potential-isolating voltage measuring transformer 2T. Thus, voltage measuring transformers 2R, 2S, and 2T produce at their outputs test voltages proportional to the respective phase voltages, such test voltages being at voltage levels suitable for signal processing. In some embodiments, potential-isolating voltage measuring transformers 2R, 2S, and 2T may be coupled to a signal-processing electronic system. The decoupling which is provided by the potential-isolating voltage measuring transformers between the high-voltage potential at the network, and the low-voltage potential at the electronic signal-processing system, prevents disturbances in the installation from being coupled into the electronic system.

In this embodiment, the current flowing from the node of the Y-filter circuit toward ground M is detected by a potential-isolating current measuring transformer 3. Current measuring transformer 3 provides at its output a test voltage proportional to the node current, the test voltage being of a magnitude suitable for signal processing. In some embodiments, current measuring transformer 3 may be coupled to a decoupling amplifier.

As indicated, the current flowing from the Y-circuit node to ground M equals zero when the network phases RST are feeding a balanced load (not shown), and the associated LC series resonant circuits are identically constructed. Thus, the measurement of a non-zero current between the Y-circuit node and ground indicates that the network is feeding an asymmetrical load, or a defect has occurred in one of the sectional capacitors in one of the capacitor batteries. A compensation circuit is provided for eliminating the influence of asymmetrical loading of the network. The compensation circuit comprises electronic filter simulators 4R, 4S, and 4T, a summing amplifier 5, and a differential amplifier 6. Electronic filter simulators 4R, 4S, and 4T, which are illustrated and discussed in detail with respect to FIGS. 2 and 3, produce phase current values which are simulated from the phase voltages which are produced by voltage measuring transformers 2R, 2S, and 2T. The simulated phase current values of the three phases are added together in summing amplifier 5 to form a simulated Y-circuit node current. The output signal of differential amplifier 6 corresponds to the compensated Y-circuit node current.

Only the fundamental frequency component of the compensated Y-circuit node current is evaluated further. The fundamental frequency component is obtained by conducting the compensated Y-circuit node current through a filter section designed as a two-stage low-pass filter having low-pass filters 7a and 7b. The parameters of the two low-pass filters 7a and 7b can be adjusted so that the harmonics are suppressed to approximately 1%, while the fundamental is damped only to about 50%. Filters 7a and 7b of the filter section are designed so that the fundamental component at line frequency is shifted in phase by about 90° between the input and output of the filter section. Thus, the fundamental frequency component of the compensated Y-circuit node current is available at the output of filter 7b.

Figure 4:
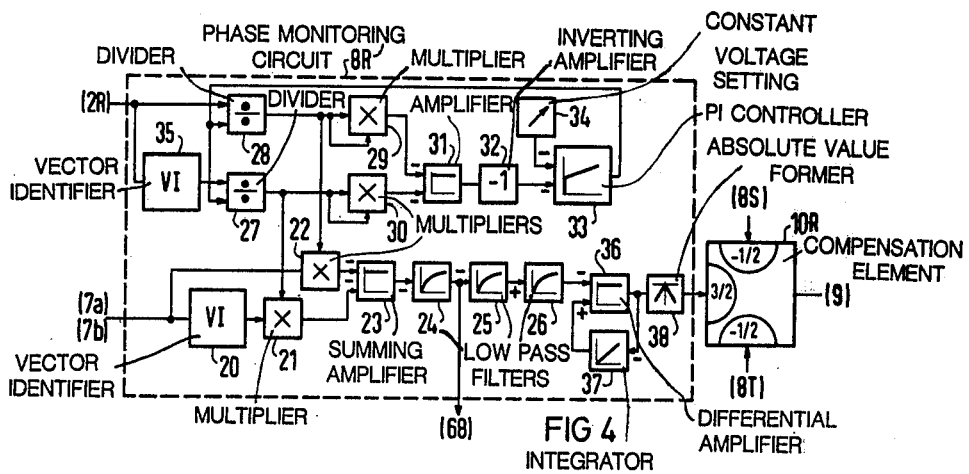
FIG. 4 is a block and line representation of a phase monitor 8R, in FIG. 1.

The fundamental frequency component of the compensated Y-circuit node current which is supplied at the output of filter 7b is conducted to phase monitoring circuits 8R, 8S, and 8T. If a sectional capacitor in one of the capacitor batteries is defective, the magnitude and phase of the Y-circuit node current will change in the phase-related Y-circuit node current monitors 8R, 8S, and 8T. Such a change in the magnitude and phase of the Y-circuit node current is resolved into a real part and an imaginary part by monitor circuits 8R, 8S, and 8T, with respect to the reference magnitude and phase of the respective phase voltages produced by the voltage measuring transformers 2R, 2S, and 2T. The phase voltages are suitable as reference quantities because they contain much fewer harmonics than the phase currents, and a resolution into a real part and an imaginary part is defined only at one frequency. An embodiment of Y-circuit node current phase monitor 8R is shown in FIG. 4, and will be discussed hereinbelow.

Figure 6:
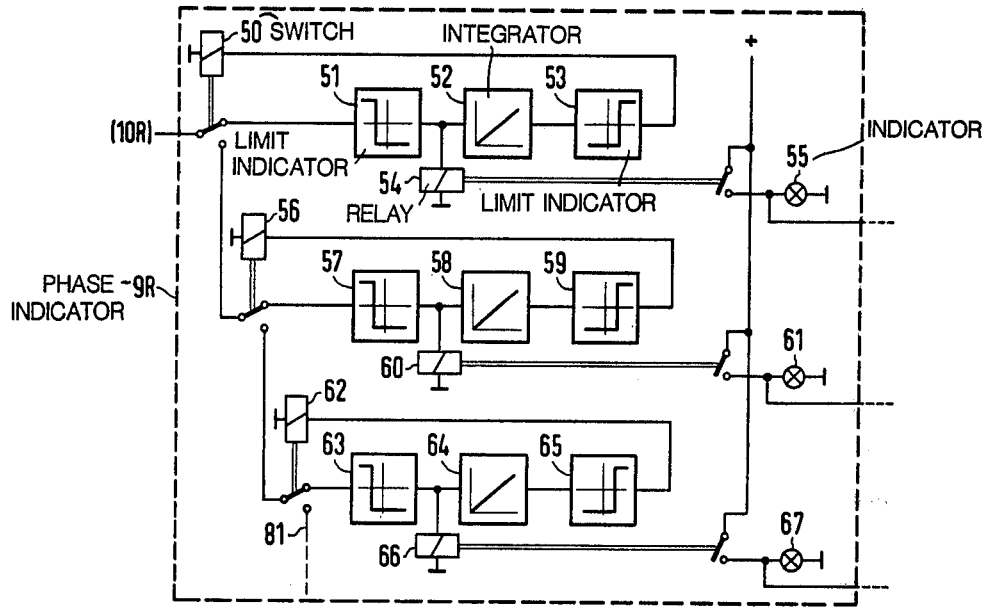
FIG. 6 is a block and line representation of a phase indicating circuit 9R, in FIG. 1.

Compensation elements 10R, 10S, and 10T couple respective outputs of the Y-circuit node current phase evaulators 8R, 8S, and 8T to a signalling and release circuit 9. Signalling and release circuit 9 indicates at phase indicators 9R, 9S, and 9T the number of sectional capacitors which are defective in each capacitor battery. An embodiment of a suitable compensation element 10R is shown in FIG. 4, and an embodiment of a suitable phase indicator 9R of the signalling and release circuit 9 is shown in FIG. 6.

In a symmetrical three-phase network RST, the compensation circuit with filter simulators 4R, 4S, and 4T, summing amplifier 5, and differential filter 6, is not necessary.

Figure 2:
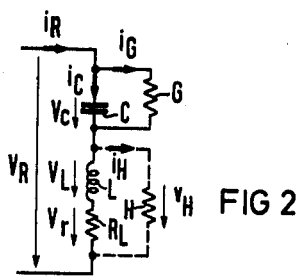
FIG. 2 is a schematic diagram of an equivalent circuit of an LC series resonant circuit.

FIG. 2 shows an equivalent circuit diagram of an LC series resonant circuit having a capacitance C of a capacitor battery, a DC conductance G of the capacitor battery, an inductance L of the choke, a DC resistance $R_L$ of the choke, and a high-pass resistance H of the choke. The current and voltages in the equivalent circuit are respectively identified.

Figure 3:
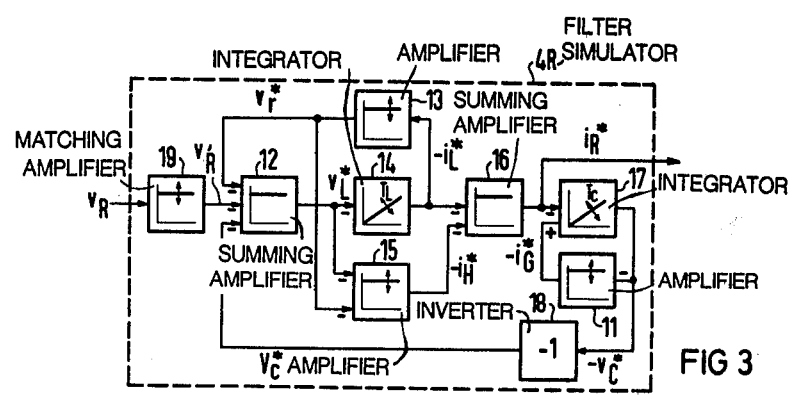
FIG. 3 is a block and line representation of an electronic filter simulator 4R, employed in FIG. 1.

FIG. 3 is a block and line representation of an electronic filter simulator 4R, which will be described with reference to the equivalent circuit diagram of FIG. 2. Electronic filter simulator 4R contains a matching amplifier 19 having adjustable gain which is driven at its input by a measured phase voltage $v_R$. A matched phase voltage $-v_R'$ is provided to a summing amplifier 12 together with a simulated capacitor voltage drop $V_C^*$ and a simulated voltage drop $v_r^*$ across the DC resistance $R_L$ of the choke. From these input parameters, summing amplifier 12 determines a simulated choke voltage drop $v_L^*$ in accordance with:

$$v_L^* = -(-v_R' + v_r^* + v_c^*) \qquad \text{Eq. 1}$$

The simulated choke voltage drop $v_L^*$ is supplied to an integrator 14 having an adjustable integration time constant $T_L$, which ascertains a simulated choke current $-i_L^*$ according to:

$$-i_L^*(t) = \frac{-1}{T_L} \int_0^t v_L^*(\tau)d\tau \qquad \text{Eq. 2}$$

The simulated choke current $-i_L^*$ is transformed in an amplifier 13 with adjustable gain into a simulated voltage drop $v_r^*$ across DC resistance $R_L$ of the choke according to:

$$v_r^* = -(-i_L^* R_L) \qquad \text{Eq. 3}$$

A further amplifier 15 having adjustable gain is provided for simulating the high-pass resistance H. Further amplifier 15 is provided at its input with the simulated choke voltage drop $v_L^*$ and the simulated voltage drop $v_r^*$ across DC resistance $R_L$ of the choke. The output voltage of amplifier 15 corresponds to the simulated current $i_H^*$ through the high-pass resistance H in accordance with equation 4. If the filter circuit is not a high-pass filter, the gain of amplifier 15 is adjusted so that its output voltage is always zero.

$$-i_H^* = -(v_r^* + v_L^*)/H \qquad \text{Eq. 4}$$

A summing amplifier 16 is provided for determining the simulated phase current $i_R^*$ according to equation 5, below. Summing amplifier 16 receives at its input the simulated choke current $-i_L^*$ and the simulated current $-i_H^*$ through high-pass resistance H.

$$i_R^* = -(-i_H^* - i_L^*) \qquad \text{Eq. 5}$$

The difference between simulated phase current $i_R^*$ and a simulated current $-i_G^*$ through the DC conductance G of the capacitor battery of the input of an integrator 17, is formed and integrated to determine the simulated capacitor voltage drop. Integrator 17, having an adjustable integration time constant $T_C$, conforms to equation 6, as follows, to produce the simulated capacitor voltage drop:

$$-v_c^*(t) = \frac{-1}{T_c} \int_0^t (i_R^*(\tau) - i_G^*(\tau))d\tau \qquad \text{Eq. 6}$$

The simulated capacitor voltage drop $v_C^*$ across capacitor battery $C_R$ is conducted by a phase-inverted amplifier 18 to an input of summing amplifier 12, and by an amplifier 11 having adjustable gain, to integrator 17. Amplifier 11 simulates the DC conductance G of the capacitor battery. The usable frequency range of the operational amplifiers of the filter model may be enhanced by advantageously wiring the operational amplifiers with so-called "feed forward damping".

FIG. 4 shows a block and line representation of Y-circuit node current phase monitor 8R, for phase R. The fundamental frequency component of the compensated Y-circuit node current from filter 7b is supplied to a vector identifier 20. Vector identifier 20 will be described in detail hereinbelow with respect to FIG. 5. Briefly, the vector identifier forms a 90° phase shift between its output and input signals. For example, if a cosine signal is applied to its input, the vector identifier will deliver a sine component at its output.

The fundamental frequency component of the compensated Y-circuit node current is resolved into real and imaginary components, the phase voltage of the respective phase R being used as a reference. As will be explained hereinbelow, it is sufficient to determine the imaginary component of the compensated Y-circuit node current. To this end, the angle component of the compensated Y-circuit node current are supplied to a first multiplier 21, and to a second multiplier 22, the additional inputs of which are coupled to the outputs of a pair of divider circuits 27 and 28. Divider circuits 27 and 28 receives normalized angle components of the phase of phase voltage R.

The phase voltage of phase R which is sensed by voltage measuring transformer 2R is supplied to an additional vector identifier 35, which is of the same design as vector identifier 20. The test voltage which is delivered by output measuring transformer 2R is regarded as a cosine component and is supplied to a divisor input of divider 28. The respective sine component delivered by vector identifier 35 is conducted to a divisor input of divider 27.

The amplitudes of the phase voltages which are used as reference quantities may fluctuate undesirably. The angle components of the phase voltages are therefore normalized by means of a non-linear control circuit. The normalized angle components are in phase with the angle components of the phase voltage, but are independent of the fluctuating amplitude thereof. It is the normalized angle components of the phase voltages which are used as reference quantities for the resolution of the compensated Y-circuit node current into real and imaginary components.

The above-mentioned non-linear control circuit which is provided for normalizing the angle components of the phase voltage of phase R, contains divider circuits 27 and 28, each of which is coupled to a respective multiplier 29 and 30, which are wired as squarers. The output signals of multipliers 29 and 30 are summed in an amplifier 31 and inverted by an inverting amplifier 32. A control amplifier 33, which is connected as a PI controller, receives at a reference input a constant voltage from a setting device 34 which corresponds to a desired amplitude of the normalized angle components. A controlled variable input of amplifier 33 receives the output signal from inverting amplifier 32. Control amplifier 33 is coupled at its output to the dividend inputs of divider circuits 27 and 28. If a difference exists between the sum of squares of the angle components of the measured phase voltage of phase R, as determined by the summing amplifier 31 and the given amplitude for the normalized angle components, the PI controller 33 will control this difference so as to achieve equality.

If one of the sectional capacitors $C_i$ in capacitor battery $C_R$ in phase R is defective, a Y-circuit node current will occur having a fundamental component which is phase-shifted by approximately 90° with respect to the phase of the voltage of phase R. Thus, the determination of the imaginary component of the Y-circuit node current will be sufficient. To this end, the angle components of the compensated Y-circuit node current are multiplied in multipliers 21 and 22 by the normalized angle components of phase voltage R. The output voltages of multipliers 21 and 22 are summed in summing amplifier 23. The output signal of summing amplifier 23 represents the imaginary component of the compensated Y-circuit, with reference to the phase of phase voltage R. When a sectional capacitor in capacitor battery $C_R$ is defective, the imaginary component corresponds to the amplitude of the Y-circuit node current. When a sectional capacitor in one of capacitor batteries $C_S$ or $C_T$ is defective, the imaginary component corresponds to half of the amplitude of the Y-circuit node current.

As described hereinabove, the circuit arrangement having divider circuits 27 and 28, multipliers 29 and 30, and amplifiers 31, 32, and 33, represent a vector analyzer. The circuit arrangement having multipliers 21 and 22, and summing amplifiers 23, is a vector rotator for an angle component.

The imaginary components of the Y-circuit node current which is formed by summing amplifier 23 is conducted by a three-stage low-pass filter having low-pass filters 24, 25 and 26, which serve to suppress harmonics that would be produced by the multipliers the dividers. The output signal of the three-stage low-pass filter is differentiated in a differential amplifier 36, the output signal of which is returned to an input of differential amplifier 36 by an integrator 37. The differentiator formed by differential amplifier 36 and integrator 37 permits a transient evaluation of the imaginary components of the Y-circuit node current. Slow changes of the Y-circuit node current, caused mainly by temperature variations in the filter circuit, are not evaluated. Sudden changes of the Y-circuit node current caused by a defect in a sectional capacitor in the capacitor battery, are forwarded as pulses to the signalling and release circuit 9, by compensation elements 10R, 10S, and 10T, and are subsequently controlled to a zero value by the differentiator formed with elements 36 and 37. After determining a defect of a first sectional capacitor, the monitoring system is ready to indicate a further sectional capacitor defect, after a period of time which is determined by the time constant of the differentiator formed with elements 36 and 37.

The output signal of the differentiator is rectified to produce a negative value by an absolute value former 38, because pulses of positive and negative polarity may occur at the output of the differentiator.

If a sectional capacitor in one of the capacitor batteries $C_S$ or $C_T$, of respective phases S or T, is defective, Y-circuit node current phase evaluator 8R, which is associated with phase R, will produce an imaginary component having a magnitude which is half of that in the circuitry associated with the phase which is actually effected. In order to accurately determine the actual one of phases RST which is affected by a defective sectional capacitor, compensation of the phase-related Y-circuit node current evaluation for the respective phases which are not affected is necessary. This is achieved by compensation element 10R which comprises a summing amplifier having a particular input wiring. The summing amplifier factorizes the signal from the respective Y-circuit node current evaluator 8R of phase R by the factor 3/2, and the signals of the evaluators 8S and 8T of the other two phases, by the factor $\frac{1}{2}$. The weighted signals of evaluators 8S and 8T of phases S and T are subtracted from the weighted signal of associated phase R. The output signal of compensation element 10R is supplied, together with the output signals of the other two compensation elements 10S and 10T, to signalling and release circuit 9, which is explained in greater detail in FIG. 6.

Figure 5A:
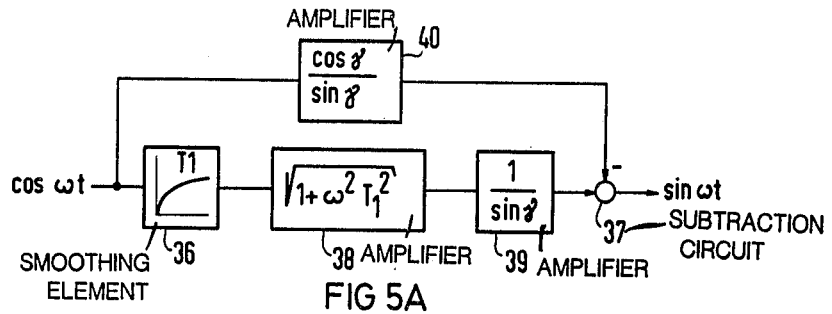
FIG. 5, which consists of FIGS. 5A, 5B, and 5C, illustrates the development of a vector identifier.

FIG. 5 shows the development of a vector identifier from a general case to a simplified circuit arrangement which is suitable for use in the present case. FIG. 5a shows the general case based on the trigonometric addition theorem:

$$\cos(\omega t - \gamma) = (\sin \omega t)(\sin \gamma) + (\cos \omega t)(\cos \gamma) \qquad \text{Eq. 7}$$

Equation 7 transforms into equation 7a, as follows:

$$\sin \omega t = \frac{1}{\sin \gamma} \cos(\omega t - \gamma) - \frac{\cos \gamma}{\sin \gamma} \cos \omega t \qquad \text{Eq. 7a}$$

Equation 7a can be embodied by using a smoothing element 36, a subtraction circuit 37, and amplifiers 38, 39, and 40. The amplifiers serve to correct the attenuation caused by the smoothing element 36.

By designating $T_1$ as the time constant of smoothing element 36 one obtains the following equation:

$$\gamma = \arctan \omega T_1 \qquad \text{Eq. 8}$$

There can be further applied the trigonometric relationship:

$$\frac{1}{\sqrt{1 + (\tan \gamma)^2}} = \frac{1}{\sqrt{1 + \frac{\sin^2 \gamma}{\cos^2 \gamma}}} = \cos \gamma \qquad \text{Eq. 9}$$

Thus, in consideration of equations 8 and 9, one obtains the following signal at the output of smoothing element 36:

$$\frac{\cos(\omega t - \gamma)}{\sqrt{1 + (\omega T_1)^2}} = \frac{\cos(\omega t - \gamma)}{\sqrt{1 + (\tan \gamma)^2}} = (\cos \gamma)(\cos(\omega t - \gamma)) \qquad \text{Eq. 10}$$

Figure 5B:
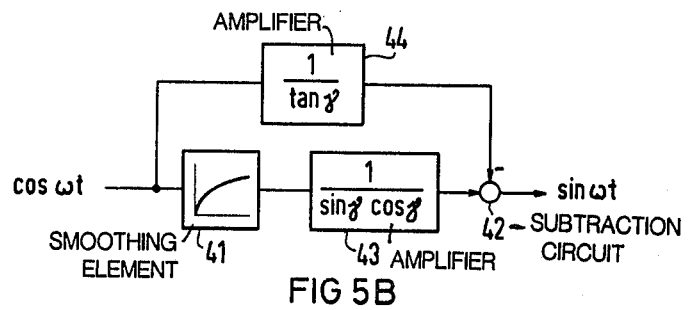

FIG. 5b shows the correspondingly transformed circuit.

For $\gamma = 45°$, there applies:

$$\tan \gamma = 1$$

$$\cos \gamma = \sin \gamma = 1/\sqrt{2}$$

For the smoothing time constant there applies:

$$T_1 = 1/\omega = 1/(2\pi f_N)$$

where $f_N$ is the network frequency.

Figure 5C:
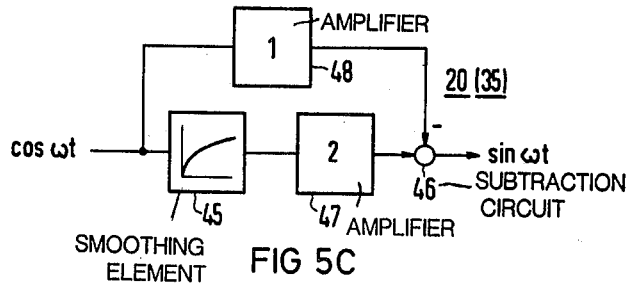

With these equations, one achieves the simplified circuit of the vector identifiers 20 and 35 shown in FIG. 5c.

FIG. 6 shows a block and line diagram of the phase indicator 9R in the signalling and release circuit 9 for transient evaluation of Y-circuit node current. The output signal of compensation element 10R is conducted by a switching device 50 to a first counting stage which comprises an input-side limit indicator 51 which is coupled at its output to an integrator 52. Integrator 52 is coupled at its output to a further limit indicator 53 which conducts a signal to switching device 50. A switching relay 54 is coupled to the output of limit indicator 51, and activates an indicator 55. The remaining counting stages which contain element 56 to 61, or 62 to 67, respectively, are constructed similarly to the described counting stage having elements 50 to 55. Input-side limit indicators 51, 57, and 63 of the individual counting stages are adjusted so that sudden Y-circuit node currents, caused by a sudden change in capacitance, trigger an indication. Such a capacitance change which may produce a release may be the result of a short circuit of one-half row in a capacitor battery. The response threshold of the input-side limits indicators 51, 57 and 63 of the respective counting stages are preferably adjusted to identical values.

Phase indicator 9R of phase R operates as follows:

If a defect occurs in a sectional capacitor $C_i$ in capacitor battery $C_R$, a corresponding pulse issues from compensation element 10R, by means of a contact of switching device 50 which, as shown in FIG. 6, couples the output of compensation element 10R to the input of limit indicator 51. Such a pulse causes limit indicator 51 to respond. The lighting of display 55 will indicate a first defective sectional capacitor in phase R. After limit indicator 51 has responded, integrator 52 accumulates a signal until its output voltage reaches the response threshold of the further limit indicator 53. The output signal of further limit indicator 53 switches the switching device 50, so that the output of compensation element 10R is coupled through the switching contact of switching device 56 to the second counting stage. The integration time of integrator 52 in the first counting stage is adjusted so as to be in the order of magnitude of a few seconds, while the down-integration time is considerably less than one second. The integration time is selected to be longer than the maximum time required for a fuse $X_i$ to open after a short circuit caused by a defective sectional capacitor. The down-integration time determines the length of time that one must push a reset button (not shown) to acknowledge the fault indication after the capacitor fault has been corrected.

In the event that a second sectional capacitor becomes defective, the second counting stage having elements 57 to 61 is actuated, if the indication of the first counting stage was not acknowledged. Such a defective second sectional capacitor is indicated by the lighting of display 61. If limit indicator 57 in the second counting stage has responded, integrator 58 accumulates a signal until its output voltage reaches the response threshold of further limit indicator 59. In response, further limit indicator 59 switches a switching device 56, so that the output of compensation element 10R is coupled to the third counting stage having elements 63 to 67. The integration time and the down-integration time of integrator 58 and the response thresholds of limit indicators 57 and 59, preferably have the same value as the first counting stage.

If a third sectional capacitor becomes defective, the third counting stage having elements 63 to 67 is actuated, if the fault indications of the first and second counting stages are not acknowledged. The third defective sectional capacitor is indicated by the lighting of display 67.

The counting stages in phase indicators 9R, 9S, and 9T of the signalling and release circuit 9 make possible a staggered monitoring strategy. Thus, if only one sectional capacitor is signalled to be defective, the filter circuit can remain in operation until the next regular servicing. However, if two defective sectional capacitors are signalled, the filter circuit can remain in operation for only a limited time, which may be the length of time which is required for maintenance personnel to be available to effect repair. Finally, if three defective sectional capacitors are signalled, the filter circuit must be immediately disconnected from the network.

Figure 7:
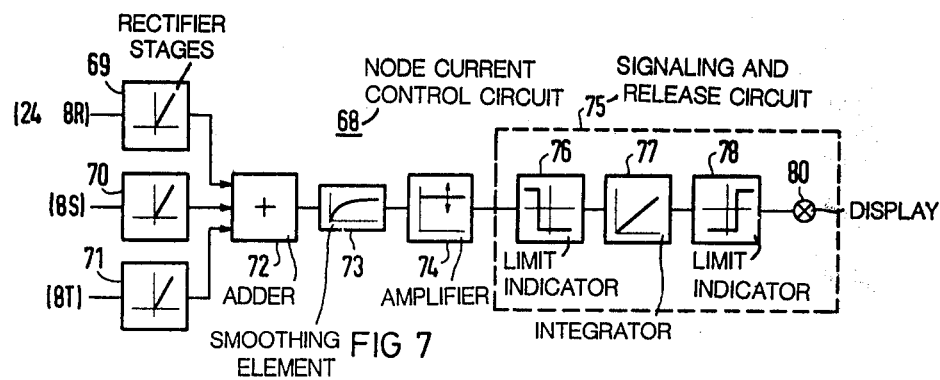
FIG. 7 is a block and line representation of a current controller which responds when a substantial degree of asymmentry exists between the phase current.

FIG. 7 shows a Y-circuit node currents control circuit 68 which is provided in addition to the transient Y-circuit node current control, discussed above. Y-circuit node current control circuit 68 responds to large asymmetries in the phase currents. Current control circuit 68 receives at its input a signal corresponding to the imaginary component of the phase-related Y-circuit filter currents of the three phases. The imaginary components of the phase related filter current of phase R is received at the output of low-pass filter 24 of the filter section in Y-circuit phase current evaluator 8R, shown in FIG. 4. The imaginary components of the filter currents of the other two phases are provided at the corresponding points of associated phase evaluators 8S and 8T. The imaginary components of the filter currents of the three phases are rectified in respective rectifier stages 69, 70 and 71. The rectified values are added in an adder 72 and smoothened in a smoothing element 73. Smoothing element 73 is coupled at its output to a matching amplifier 74 having adjustable gain which permits the smoothened value to be adjusted to a desired magnitude. The output voltage of matching amplifier 74 is applied to a further signalling and release circuit 75. Further signalling and release circuit 75 contains an input-side limit indicator 76 which is coupled at its output to an integrator 77. Integrator 77 is connected at its output to a limit indicator 78 which actuates an indicator 80. If, after a time delay determined by the integration time constant of integrator 77, and the response threshold of further limit indicator 78, the asymmetry still exists, then display 80 is actuated. In some embodiments, the output signal of further limit indicator 78 may be conducted to protective devices.

Asymmetry may be indicated from the measured Y-circuit node current which is rectified in a rectifier 82, in FIG. 1. This quantity is smoothened in a smoothing circuit 83, and indicated by a measuring instrument 84. Measuring instrument 84 indicates the amplitude of the Y-circuit node current.

In embodiments of the invention wherein it is desirable to indicate defects in more than three sectional capacitors, phase indicator 9R, shown in FIG. 6, can be expanded by connecting additional counting stages to line 81. The signals which actuate displays 55, 61, and 67 can be provided in parallel to an installation protecting device (not shown) which, in case of malfunction, isolates the filter circuit from the network by means of switching device 1.

Although the inventive concept has been disclosed in terms of specific embodiments and applications, other embodiments and applications, in light of this teaching, will be obvious to persons skilled in the pertinent art. For example, although filters of the low-pass type are used in this diclosure, persons skilled in the art may use other types of filters, illustratively resonant filter circuits, without departing from the scope of the invention. The drawings and descriptions in this disclosure are illustrative of the principles of the invention, and should not be construed to limit the scope thereof.

What is claimed is:

1. A monitoring system for the capacitor batteries of a three-phase filter circuit having three filter legs connected in a Y-circuit configuration, the Y-circuit node being connected to a reference potential, each capacitor battery being of the type having a plurality of parallel legs, each leg having a plurality of sectional capacitors connected in series with respective fuses, adjacent ones of the sectional capacitors being coupled to one another, the system further comprising means for determining variations in the magnitude and phase of a fundamental frequency component of a zero current flowing from the Y-circuit node of the three-phase filter circuit to the reference potential, said variations being evaluated to identify defective ones of the sectional capacitors in a capacitor battery.

2. The monitoring system of claim 1 wherein said variations in said magnitude and phase of said fundamental frequency component of said zero current are evaluated transiently.

3. The monitoring system of claim 1 wherein there are further provided:
current measuring transformer means for measuring said zero current flowing from said Y-circuit node of the three-phase filter circuit to said reference potential;
first, second, and third voltage measuring transformer means for providing respective signals responsive to respective network phase voltages of the filter circuit;
filter means for producing said fundamental frequency components of said zero current;
zero current phase evaluation means responsive to said fundamental frequency component of said zero current from said filter means, said zero current phase evaluation means being further responsive to said first, second, and third voltage measuring transformer means, said zero current phase evaluation means forming a fault signal from said imaginary component of said fundamental frequency component of said zero current, said phase evaluation of said zero current being performed with reference to said first, second, and third voltage measuring transformers, said evaluation being performed transiently by a differentiator;
compensation means responsive to said zero current phase evaluation means for disregarding output signals of selectable ones of said zero current phase evaluation means corresponding to capacitor batteries which are not affected by a defective sectional capacitor; and
signalling and release means having phase indicators coupled to respective ones of said compensation means, said signalling and release circuit having counting stages for determining the number of sectional capacitors in a capacitor battery which have failed.

4. The monitoring system of claim 1 wherein there is further provided:
compensation circuit means for forming a compensated zero current;
voltage measuring transformer means for producing signals responsive to network voltage values at the three-phase filter;
electronic filter simulators coupled to said voltage measuring transformer means, for producing respective output signals;
summing amplifier means for producing a simulated zero current, said summing amplifier means being adapted to receive said output signals of said electronic filter simulators;
current measuring transformer means for providing an output signal responsive to a measured zero current; and
differential amplifier means for forming a signal responsive to differences between said simulated zero current simulated by said summing amplifier means, and said zero current measured by said current measuring transformer means.

5. The monitoring system of claim 4 wherein said electronic filter simulator further comprises:

summing amplifier means for determining a simulated voltage drop of a choke to which are supplied a signal produced by said voltage measuring transformer means, a simulated capacitor voltage drop, and a simulated voltage drop across a DC resistance of a choke;

integrator means coupled to said summing amplifier means for determining a simulated choke current;

amplifier means coupled to said integrator means for determining a simulated voltage drop across said DC resistance of said choke;

further amplifier means coupled to said summing amplifier means and said amplifier means for determining a simulated current of an equivalent high pass resistance of said choke;

further summing amplifier means coupled to said integrator means and said further amplifier means, for determining a simulated capacitor voltage drop; and an amplifier coupled to said integrator means for determining a simulated current through the DC conductance of the capacitor battery.

6. The monitoring system of claim 3 wherein said zero current phase evaluation means further comprises:

vector identifier means triggered by said fundamental frequency component of said compensated zero current for identifying an angle component of said zero current which is phase-shifted by 90°;

further vector identifier means responsive to said voltage measuring transformer means for determining a further angle component which is shifted in phase by 90°;

non-linear control circuit means for normalizing said further angle components of said measured phase voltage;

first and second multiplier means, each such multiplier means receiving respective angle components corresponding to said compensated zero current and an associated normalized phase voltage;

summing amplifier means for forming an imaginary component of said compensated zero current of a selectable phase;

low-pass filter means for suppressing harmonics in said imaginary component of said compensated zero current of a selectable phase;

differentiator means for transiently evaluating said imaginary component of said compensated zero current of a selectable phase; and absolute value former means coupled to said differentiator means for rectifying an output signal thereof.

7. The monitoring system of claim 3 wherein each compensation means comprises a summing amplifier which is connected at its input by an input resistance to the output of all phase-related zero current evaluator means, the output signals of respective ones of said zero current evaluator means being factorized by a factor of 3/2 and the signals of said remaining zero current evaluator means being factorized by a factor $-\frac{1}{2}$.

8. The monitoring system of claim 3 wherein said counting stages of said phase indicator means each contain a limit indicator means for controlling a display, and a time member for controlling the operation of a switching device to a further counting stage.

* * * * *